United States Patent
Schwiers et al.

(10) Patent No.: US 8,374,824 B2
(45) Date of Patent: Feb. 12, 2013

(54) WIRELESS DATA TRANSMISSION OF A REFRIGERATED CONTAINER UNIT

(75) Inventors: Stefan Schwiers, Monchengladbach (DE); Adalgiso Castrignano, Dornbirn (AT)

(73) Assignee: IDENTEC Solutions AG, Lustenau (AT)

( * ) Notice: Subject to any disclaimer, the term of this patent is extended or adjusted under 35 U.S.C. 154(b) by 751 days.

(21) Appl. No.: 12/390,594

(22) Filed: Feb. 23, 2009

(65) Prior Publication Data

US 2009/0216497 A1 Aug. 27, 2009

Related U.S. Application Data

(60) Provisional application No. 61/031,943, filed on Feb. 27, 2008.

(51) Int. Cl.
*G06F 11/00* (2006.01)

(52) U.S. Cl. ........... 702/188; 702/99; 702/182; 702/189

(58) Field of Classification Search .................... 702/99, 702/182, 188, 189; 340/10.1, 585; 62/239
See application file for complete search history.

(56) References Cited

U.S. PATENT DOCUMENTS

| | | | |
|---|---|---|---|
| 7,129,837 B2 * | 10/2006 | Shannon et al. | 340/539.13 |
| 7,414,527 B2 * | 8/2008 | McNay | 340/539.13 |
| 2004/0131125 A1 * | 7/2004 | Sanderford et al. | 375/261 |
| 2004/0233041 A1 * | 11/2004 | Bohman et al. | 340/10.1 |
| 2007/0040647 A1 * | 2/2007 | Saenz et al. | 340/3.1 |
| 2009/0237258 A1 | 9/2009 | Heck et al. | |

* cited by examiner

*Primary Examiner* — Mohamed Charioui
*Assistant Examiner* — Elias Desta
(74) *Attorney, Agent, or Firm* — Norris McLaughlin & Marcus, P.A.

(57) ABSTRACT

A system and method for monitoring data associated with a temperature controlled container with a Reefer Unit. The monitored data retrieved from the Reefer Unit is wirelessly transmitted to an evaluation unit via at least one transponder. The transponder is connected via a wireless interface of an antenna with a reader/transmitter. The wireless interface transmits the monitored data via a bus from the reader/transmitter to a converter which then transmits the converted monitored data via a communication interface to the evaluation unit. Aside from retrieving monitored data remotely, the system can also issue remote forward commands to provide full automation and control of such containers.

15 Claims, 2 Drawing Sheets

WIRELESS DATA TRANSMISSION OF A REFRIGERATED CONTAINER UNIT

CROSS-REFERENCE TO RELATED APPLICATIONS

This application claims priority to U.S. Provisional Application No. 61/031,943, filed Feb. 27, 2008, which is herein incorporated by reference in its entirety.

BACKGROUND OF THE INVENTION

1. Field of the Invention

The present invention is directed to temperature controlled containers, and in particular, to two way wireless monitoring and controlling of Reefer Units associated with temperature controlled containers.

2. Description of Related Art

Temperature controlled containers are used to ship or transport assets requiring temperature controlled environments such as, but not limited to, perishable food. Such temperature controlled containers are typically mobile, for example, being transported via road, railroad or water.

Due to the need for accurate control of the temperature sensitive environment any change in temperature, regardless how small, may have a deleterious effect on the state of the cargo or assets contained therein. It is therefore desirable to develop a system for receiving time sensitive information transmitted wirelessly to software analysis programming that generates displays and reports. In addition to receiving such information from the containers it is desirable to develop a system for issuing remote forward commands to provide full automation and control of such containers. Such an improved system and method would provide efficient detection and troubleshooting of problems.

SUMMARY OF THE INVENTION

The present invention concerns a "Reefer Tag", which will connect to temperature controlled containers via a serial device such as an RS232 interface. Periodically and/or on command from an RFID Reader/Transmitter, the Reefer Tag establishes communications with a Reefer Unit and retrieves reefer or container information about a corresponding temperature controlled container. Each Reefer Unit has an associated controller or microprocessor (4b, 5b, 6b). Accordingly, the Reefer Tag and controller or microprocessor of the associated Reefer Unit communicates with one another. The Reefer Tag is preferably compatible with multiple protocols and different baud rates that are used with existing and/or future controllers or microprocessors of the Reefer Units. In such a situation, the Reefer Tag preferably automatically detects the proper baud rate from a group of predetermined speeds, for example, a group of baud rates including approximately 1200 Baud, 2400 Baud, 4800 Baud, 9600 Baud, or 19.2 kilo Baud or higher.

One embodiment of the present invention is directed to a system for monitoring data associated with a temperature controlled container with a Reefer Unit. The monitored data retrieved from the Reefer Unit is wirelessly transmitted to an evaluation unit via at least one transponder. The transponder is connected via a wireless interface of an antenna with a reader/transmitter. The wireless interface transmits the monitored data via a bus from the reader/transmitter to a converter which then transmits the converted monitored data via a communication interface to the evaluation unit. Aside from retrieving monitored data remotely, the system can also issue remote forward commands to provide full automation and control of such containers.

Another embodiment of the present invention is directed to a method for evaluating information associated with and control of at least one Reefer Unit for at least one temperature controlled container. Data associated with at least one temperature controlled container with the at least one Reefer Unit is retrieved and transmitted wirelessly from at least one transponder to at least one reader/transmitter. The received data is transmitted to a host computer via the at least one reader/transmitter. Host software is used to evaluate the data received by the host computer and display the evaluated data.

The invention further relates to the generation by the host software at the host computer of at least one of a command, control and programming signal which is transmitted from the host computer to the at least one reader/transmitter. This at least one command, control and programming signal is passed from the at least one reader/transmitter to the at least one Reefer Unit, with or without the at least one transponder interpreting the data. The at least one transponder will preferably receive the response from the at least one Reefer Unit to this at least one command, control and programming signal and transmit it to the host computer using the at least one reader/transmitter.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

Figure 1:
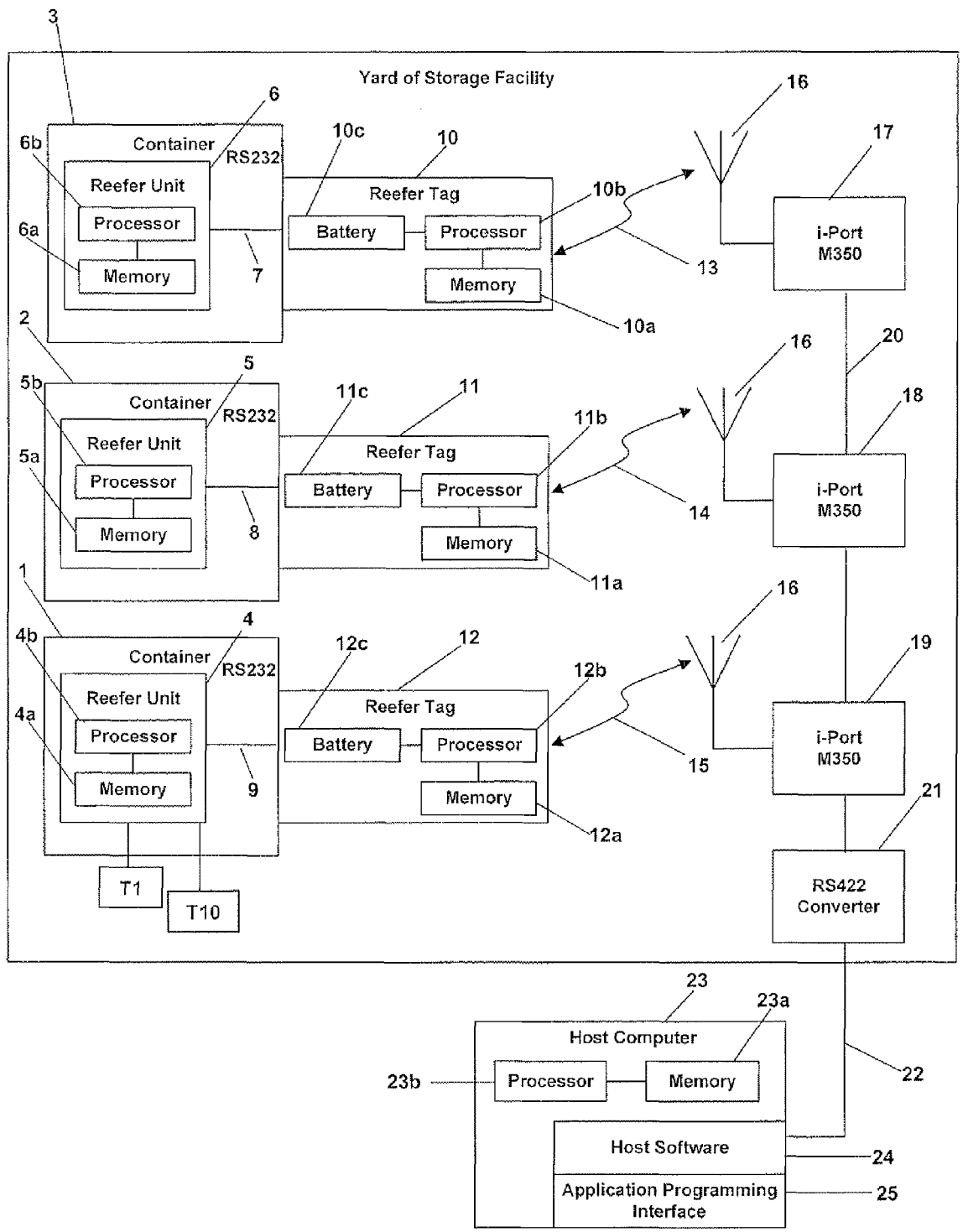
FIG. 1 shows an exemplary system overview of the present invention.

FIG. 1 depicts an exemplary yard or storage facility which includes three temperature controlled containers 1, 2, 3 in which a product, item, object, cargo or asset is housed or contained during shipment or transport. The temperature controlled containers may be mobile and transportable via a vehicle, ship, railroad car or other means of transport. Three temperature controlled container units 1, 2, 3 are illustrated, however, any number of one or more temperature controlled containers are contemplated and within the intended scope of the present invention. Each temperature controlled container 1, 2, 3 has a corresponding Reefer Unit (e.g., refrigeration or cooling device) 4, 5, 6 mounted to or disposed at least partially in the temperature controlled container. Reefer Units 4, 5, 6 use sensors to measure physical environment parameters, for example, interior temperature of the container is detected by sensor T1, ambient temperature is detected by sensor T0, interior humidity of the container, ambient humidity, close/open state of the door of the temperature controlled container) and transmits this data via the respective serial bus 7, 8, 9 to Reefer Tags 10, 11, 12. A Reefer Tag 10, 11, 12 is a transponder or radio frequency identification (RFID) tag electrically connected to each Reefer Unit 4, 5, 6 by way of a communication interface, preferably a bi-directional serial bus 7, 8, 9 such as an RS232. The Reefer Tags support bidirectional communications between the Reefer Unit and the host computer or server 23 that monitors the system. Both the Reefer Tags and Reefer Units preferably have corresponding internal memory devices (10a, 11a, 12a) (4a, 5a, 6a). Each Reefer Tag is a self-powered, autonomous two-way communications device that attaches to an existing data port connection present on all temperature controlled containers. The electronic circuitry for operating the Reefer Tag including the processor (10b, 11b, 12b) is enclosed in a housing such as plastic. Each Reefer Tag is mounted to a Reefer Unit either permanently or via a standardized releasable connector (e.g., magnetic mounting pad). The Reefer Tag is an active tag self-powered by a replaceable internal battery (10c, 11c, 12c), preferably having a lifetime of approximately 3 years. Since the Reefer Tag is self-powered, there is no need for an external power source. Communication range is preferably relative long (e.g., up to approximately 500 m) and depends on such factors as the battery lifetime and system features.

Each Reefer Tag is programmed to: (i) identify and communicate with the Reefer Unit; (ii) detect if a Reefer Unit or other serial device is connected to the Reefer Tag and, if so, determine whether the Reefer Unit or other serial device is powered ON; (iii) monitor information associated with the Reefer Unit without requiring continuous communication between the Reefer Unit and Host Computer (such monitoring is flexibly configured by the Host Computer (e.g., set monitoring interval and/or specify data to be monitored); (iv) establish bidirectional communication between the Reefer Unit and Host Computer. Since the Reefer Tag is self-powered, even if the Reefer Unit is powered OFF and communication is disabled, the Reefer Tag is still able to detect whether a Reefer Unit is connected to the Reefer Tag and, if so, its power status. In addition, any previously reported information prior to powering OFF of the Reefer Unit will be able to be obtained by the Reefer Tag.

Reefer Tags 10, 11, 12 send data to and receive data from a corresponding RFID antenna 16 via bidirectional wireless interfaces 13, 14, 15. Each antenna 16 is electrically connected with a corresponding RFID reader/transmitter 17, 18, 19 such as an i-Port M350. A Compact flash reader/transmitter may be used in integration with a handheld RFID reader/transmitter. The Reefer Tag and the corresponding antenna are preferably separated by up to approximately 500 m. The number of RFID readers/transmitters used per site will depend on the site size and configuration of the RFID readers/transmitters. In the example provided in FIG. 1, three RFID readers/transmitters 17, 18, 19 are daisy chained via bus 20 and connected to the host computer or server 23 via a single converter 21 (e.g., RS422 converter) and interface 22 (e.g., Ethernet, LAN, WLAN, USB, or wireless interface). Although only a single converter 21 is shown more than one may be provided, one per each reader/transmitter. Evaluation host software such as a web based software application in a computer readable medium and stored in a memory device associated with the host computer or server 23 collects, analyzes, disseminates & displays (e.g., in the form of graphs and/or reports) the received reefer information. The final data may be pushed through to be accessible by user interfaces.

Associated application programming interface (API) 25 is provided for the host software 24 stored in an internal memory 23a and run on a processor 23b associated with the host computer 23. The host software 24 uses the API 25 to access all functionalities of the system thereby simplifying implementation of the host software. Those API provide a high level of interface and abstraction for all available features. For example, the host software automatically receives an event if something has changed, while a command sent to a Reefer Unit even if composed of multiple data exchange between Reefer Tag and RFID transmitter/reader will be a simple command for the host software.

In a preferred embodiment, the API implements all functionalities including, but not limited to:
 read data (e.g., measured physical parameters) from a Reefer Unit;
 generate a command, control and programming signal to be sent to a Reefer Unit;
 report to the host software all information regarding Reefer Units and information status conditions for Reefer Tags and RFID readers/transmitters;
 report monitored data or changes in monitored data;
 report any kind of system alarm of any system component (e.g., low Reefer Tag battery or no communication with RFID reader/transmitter or Reefer Tag);
 establish bidirectional communication with Reefer Unit;
 configure data to be monitored on a Reefer Unit.

The reefer or container information may include, for example, set temperature, detected temperature, alarm conditions, door status, asset location, gate movements, preventative maintenance, and fuel levels. In addition, the host software may be used to wirelessly transmit forward command, programming or control signals back to the Reefer Unit to adjust one or more physical parameters based on the received reefer information thereby providing full automation and control. Some functions that may be controlled by the host computer 23 include, but are not limited to: (i) alarm clearing; (ii) pre-trip start/stop, and (iii) set point changes to a physical parameter. Such adjustment may be controlled either automatically based on preset physical condition threshold parameters, or alternatively may be controlled based on operator or user input. Thus, the RFID reader/transmitter 17, 18, 19 receives broadcast messages from Reefer Tags 10, 11, 12, and process command, control and/or programming signals generated by the host software using the API and circuitry associated with the host computer 23. The daisy chain of RFID readers/transmitters can be connected via cables (e.g., CAT 5 cable) with the power to the RFID readers/transmitters transmitted over the communication cable. Some limitations apply based on the cable length, number of readers/transmitters per bus and power supply used to power the RFID readers/transmitters.

Each Reefer Tag 10, 11, 12 preferably has an associated audible and/or visual display (e.g., one or more LEDs) for identifying the status of one or more functions of the Reefer Tag. For example, such function is not limited to but may include: (i) battery life status; (ii) power status (e.g., ON/OFF) of the Reefer Tag, and (iii) whether the Reefer Tag is physically connected to a serial port and communication has been established with a Reefer Unit. The status of one or more Reefer Tag functions is preferably checked either periodically or continuously while the Reefer Tag is connected to a Reefer Unit 4, 5, 6. In addition, the status of one or more Reefer Tag functions may also be checked upon receiving a request from an operator such as by pushing a button associated with the Reefer Tag.

By way of illustrative example, each Reefer Tag 10, 11, 12 may have three LEDs that will blink for a predetermined period of time, e.g., approximately 5 seconds. The three exemplary LEDs are programmed as follows:
 BATTERY LED→GREEN if power level of the battery is satisfactory; RED if battery needs to be replaced.
 POWER LED→GREEN if microcontroller is powered ON and the Reefer Tag is physically connected to the serial port; RED if either the Reefer Tag is not physically connected to the serial port or the microcontroller is powered OFF.

REEFER INFORMATION LED→GREEN if the Reefer Tag is physically connected to the serial port and container information is being retrieved; ORANGE if the Reefer Tag is physically connected to the serial port but it is not possible to retrieve container information; RED if the Reefer Tag is not physically connected to the serial port.

This example is not intended to limit in scope any other visual indication configuration or design of the status of the functionality of the Reefer Tag.

Reefer Tag 10, 11, 12 broadcasts to the host computer 23 on a predetermined configurable interval (e.g., approximately every 20 to 60 seconds) a message including, but not restricted to:

unique Reefer Tag ID
status of the Reefer Tag battery
Reefer Unit (cooling system) status: e.g., connection, Reefer Unit power status, monitoring error
Reefer Unit (cooling system) serial number, the serial number is transmitted only if it has been read
Reefer Unit (cooling system) monitoring data. All data successfully monitored by the Reefer Tag will be added to the beacon message and reported to the host software.

Figure 2:
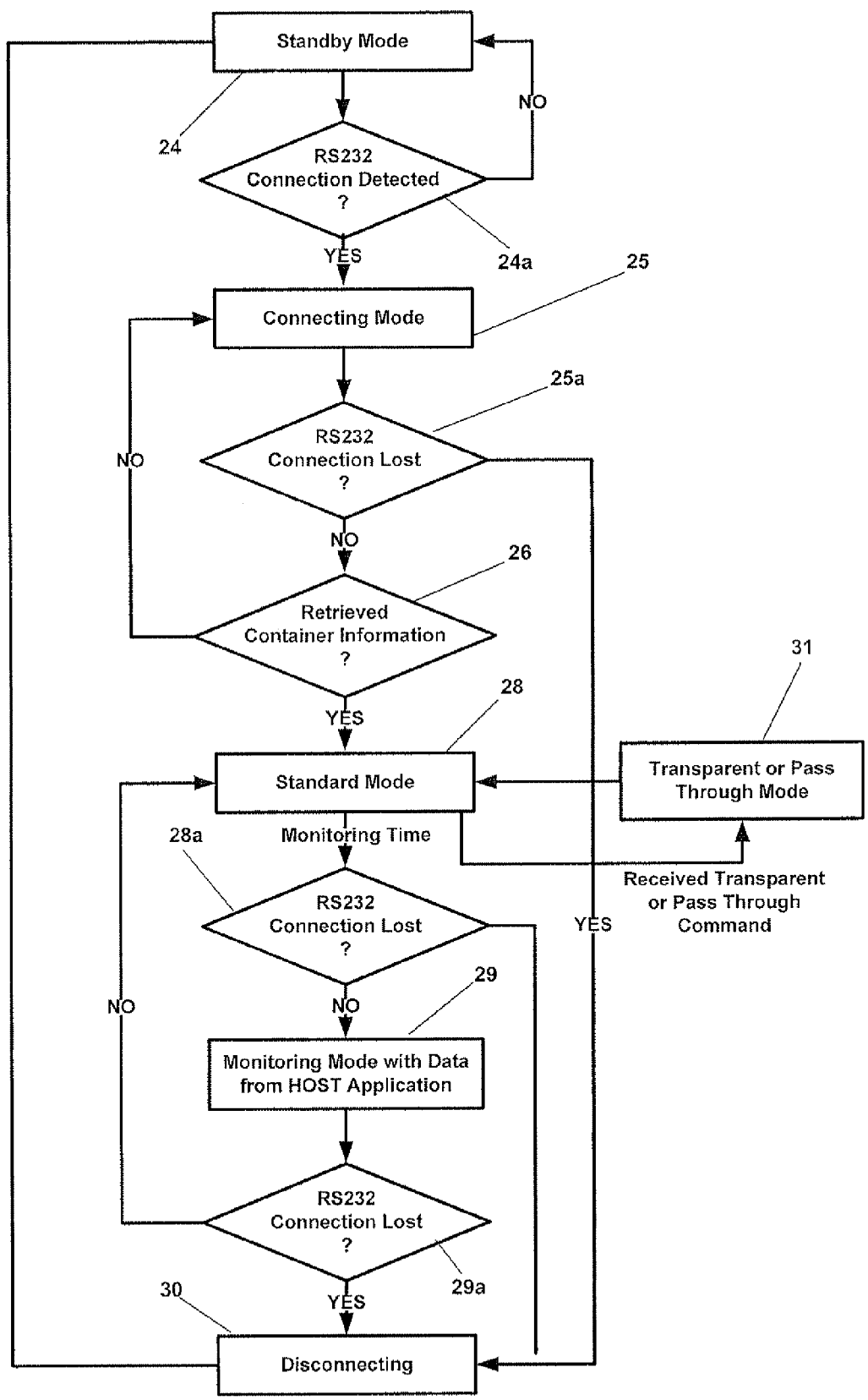
FIG. 2 shows a process flow diagram of transition condition between Reefer Tag modes for the system in accordance with the present invention.

Each Reefer Tag 10, 11, 12 is programmed to operate in one of five modes including: (i) standby mode; (ii) standard mode; (iii) monitoring mode; (iv) connecting mode, and (v) transparent or pass-through mode. FIG. 2 is an exemplary flow diagram representing the transition conditions between Reefer Tag modes.

In the standby mode 24, Reefer Tag 10, 11, 12 is not connected to a corresponding Reefer Unit 4, 5, 6. When entering the standby mode represented by block 24 the Reefer Tag 10, 11, 12 clears from memory all information regarding the Reefer Unit 4, 5, 6 to which it was previously connected. Reefer Tag 10, 11, 12 remains in standby mode 24 as long as it does not detect any serial device (e.g., RS232) connection to the serial port depicted by step 24*a*. A connection of a serial device to the serial port is determined by checking the Reefer Tag RX pin and/or power pin state. If The RX pin is active, then a device is connected and powered ON. But if RX pin is not active then the state of the power pin is checked. If the power pin state is active this means a device is connected but not powered, and if the power pin state is not active this indicates that no device is connected.

As soon as connection of a serial device has been detected, at step 24*a*, Reefer Tag 10, 11, 12 is placed in connecting mode in step 25. The connecting mode is only a transition state while an operator physically connects the Reefer Tag 10, 11, 12 to the corresponding Reefer Unit 4, 5, 6. If the connection to the serial device is lost while in connecting mode, at step 25*a*, the Reefer Tag 10, 11, 12 is again disconnected and returns to standby mode in block 24. Otherwise, while in the connecting mode depicted by block 25 with the serial device connection in place the Reefer Tag 10, 11, 12 attempts to establish communication and retrieve container or reefer information, at step 26. Specifically, the Reefer Tag 10, 11, 12 sends a signal identifying the type of Reefer Unit controller/microprocessor (e.g., Carrier™, Thermo King™) and its unique serial number at the proper baud rate for that particular controller/microprocessor. In a preferred embodiment, the Reefer Tag is preferably compatible with multiple types of controllers/microprocessors having different protocols and baud rates. In such a situation, the Reefer Tag preferably automatically detects the proper baud rate, typically, from among approximately 1200 Baud, 2400 Baud, 4800 Baud, 9600 Baud, 19.2 kilo Baud, for the particular type of Reefer Unit controller/microprocessor. Specifically, a unique serial number and associated information of the Reefer Unit controller is stored in memory at the time of manufacture. This information is retrieved by the Reefer Tag using the controller specific command. To retrieve the correct controller type/baud rate the Reefer Tag attempts to communicate with the controller using all known type/baud rate configurations. Once communication is successful and the baud rate has been found, the Reefer Tag retrieves the unique serial number and information using the command or set of commands specific to the controller type connected to the Reefer Tag.

The Reefer Tag 10, 11, 12 attempts all supported baud rates for a particular type of controller/microprocessor and if communication fails it will again try all supported controller type/baud rates, reattempting preferably approximately every 5 minutes. The reefer or container information once it has been successfully read, at step 26, is stored in an internal or associated memory and the Reefer Tag 10, 11, 12 is placed into standard mode, at step 28. While in the standard mode (block 28), the Reefer Tag 10, 11, 12 is connected to and retrieves from the Reefer Unit 4, 5, 6 information regarding its type of controller/microprocessor and unique serial number.

To transition into the monitoring mode represented by block 29, the host software configures the Reefer Tag to monitor the Reefer Unit. Monitoring includes reading on a predetermined configurable time interval one or more specific tables and blocks from the memory associated with the Reefer Unit. Some Reefer Units may not have their memory configured as tables and blocks so monitoring may be done by other mechanism. The beacon message is configured so that one or more specified monitored bytes based on its position is transmitted in the message. In a preferred embodiment, a maximum of 32 bytes may be monitored. Successfully monitored data is always included in the beacon message, the monitoring mode only updates the monitored data with new data read from the Reefer Unit in order to be later broadcasted.

An illustrated example of bytes to be monitored is provided in the Table below. For the purpose of the example illustrated below, the monitoring interval is set to 15 minutes, however, as previously noted the monitoring interval is freely configurable.

TABLE

| Table # | Block # | Starting Byte Position | # of Bytes | Comment |
|---|---|---|---|---|
| 15 | 1 | 0 | 2 | The Reefer Tag reads table 15 block 1 of the Reefer Unit controller memory and adds to the broadcast monitoring message 2 bytes starting from position 0 |
| 15 | 1 | 10 | 5 | Identical to that in the first row but adds to the broadcast monitoring message 5 bytes starting from position 10 |
| 11 | 2 | 5 | 1 | The Reefer Tag reads table 11 block 2 of the Reefer Unit controller memory and adds to the broadcast monitoring message 1 byte starting from position 5 |

The beacon message reported to the host computer 23 is composed of 8 bytes including:
2 bytes starting from position 0 read from table 15 block 1
5 bytes starting from position 10 read from table 15 block 1
1 byte starting from position 5 read from table 11 block 2

If the Reefer Tag cannot read all the data specified to be monitored only that data successfully read will be returned. If the connection to the serial device, which is checked continuously or periodically, for example at step 28*a*, is lost the Reefer Tag will disconnect at step 30 and return to standby mode 24. While monitoring the Reefer Unit, additional errors can be reported, for example, if a requested byte position is out of range. While in monitoring mode, if the Reefer Tag detects a disconnected RS232 interface (by checking the connection at the RX and power pin of the Reefer Tag) (step 29*a*), it will disconnect, at step 30, and return to standby mode 24. Furthermore, if there is a communication failure with the Reefer Unit while in monitoring mode the Reefer Tag will revert back to standard mode 28.

When a Reefer Tag detects a disconnected serial port, it will clear all internal information regarding the Reefer Unit it was connected to and return to standby mode 24.

In addition to receiving container information from the Reefer Unit the host computer or server 23 is programmed to transmit back to the Reefer Unit command, control and/or programming signals during a transparent or pass-through mode (block 31). The transition from transparent mode to standard mode occurs at the end of execution of a transparent command. The end is either when the Reefer Tag has sent the transparent command it received from the host to the controller or when a response to the transparent command has been received by the Reefer Tag from the controller or when a timeout occurs.

In this transparent or pass-through mode the command, control and/or programming signal generated by the host software of the host computer 23 is transmitted to the Reefer Unit, with or without the Reefer Tag interpreting the data. While in the transparent or pass-through mode the Reefer Tag will preferably only retransmit messages received with a destination address other than the Reefer Tag without interpreting the data. This does not preclude some type of protocol translation, for example, adding a cyclic redundancy check (CRC) or other error detection scheme if the translation is common to all types of Reefer Units. The transparent or pass-through mode thereby allows the host computer 23 to issue any specific command, control and/or programming signal back to the Reefer Unit. Preferably, only a single command, control and/or programming signal such as to read or write a single table block is issued via this transparent mode, not a time sequenced or complex command representing a succession of commands with a time restriction between commands. The reason for preferably restricting command, control and/or programming signals to a single command is because a predetermined maximum time restriction is set between 2 consecutive commands that may not be adhered to if the time between 2 consecutive commands is too short (which is usually the case with complex commands). Accordingly, single rather than complex commands are preferred.

Regardless of the mode, the preferred maximum message length of all communications is 255 Byte+Header.

EXAMPLE

An illustrative example of the system component specifications is provided. The Reefer tag has the following specifications:

| | |
|---|---|
| Identification code | 32 bit fixed ID |
| Read rate | Up to 100 tags/s (only Identification Code) |
| | Up to 35 tags/s @ 128 bit data reading |
| Response time | <300 ms (single tag) |
| Multiple tags handling | Up to 2,000 tags in the read zone |

-continued

| | |
|---|---|
| Read/write range | 200 m (656 ft) @ free air Line of sight at 19.2 Kbit/s |
| Operating frequency | 902-928 MHz (NA) ISM Band (narrow band). |
| Data rate (upload to Reefer Tag) | 19.2 up to 115.2 kbits/s |
| Data rate (download to RFID reader/transmitter) | 19.2 up to 115.2 kbits/s |

While the RFID readers/transmitters (e.g., i-Port M350 reader/transmitter) have the following design specifications:

| | |
|---|---|
| Read rate | Up to 100 tags/s (only Identification Code) |
| | Up to 35 tags/s @ 128 bit data reading |
| Response time | <300 ms (single tag) |
| Multiple tags handling | Up to 2,000 tags in the read zone |
| Read/write range | 500 m (650 ft) @ free air, Line of sight at 19.2 Kbit/s |
| Operating frequency | 902-928 MHz (NA) ISM Band (narrow band) |
| Data rate (upload to tag) | 19.2 up to 115.2 kbits/s |
| Data rate (download to reader/transmitter) | 19.2 up to 115.2 kbits/s |

In this example, communication from the Reefer Tag to the Reefer Unit is selected at one from a predetermined range of speeds: 9600 baud (by default) or 1200 baud. As indicated above, the Reefer Tag automatically determines the correct communication speed.

The container information in this example is located in table 5, block 1, as follows:

Byte 0 to 7→Controller Serial Number (ASCII HEX)
Byte 8 to 9→Controller software version
Byte 10 to 20→Container ID (ASCII HEX)

Except for table 5, block 1, no additional table/block data needs to be parsed by the Reefer Tag.

An application programming interface (API) 25 is provided to interface with the host software 24 as well as convert all communication between the host computer 23 and all RFID readers/transmitters and Reefer Tags on site. The Application Programming Interface will provide a method to be called by the host software at a predetermined interval of preferably approximately 2 seconds. This call will poll all RFID readers/transmitters for all Reefer Tag broadcast events received and process all events to report such events back to the host software. This tag event collection method is preferably not called simultaneously with any other commands. In addition to collecting tag events, upon reception of events the application programming interface will define if the status of the Reefer Tag has changed and report any changes to the host computer.

On the one hand, in the event that the Reefer Tag is connected to a Reefer Unit, the reefer/container information will be read and reported to the host software. The Reefer Tag will broadcast on a predefined interval this information but the event will only be reported once to the host software. On the other hand, in the event that the Reefer Tag is disconnected to a Reefer Unit, the Reefer Tag reports such disconnected status to the host software. The Reefer Tag will broadcast on a predefined interval this information but this event will only be reported once to the host software. Detection of an error condition during monitoring of the Reefer Unit will also be reported to the host software.

All monitored data read from the Reefer Unit on a configurable interval will continuously be sent by the Reefer Tag in the broadcast message The API will check the monitored data and report to the host software any change in the data (change of at least 1 byte or change in data length).

Lastly, any system error or warning messages will be reported to the host software. Those messages or events may include, but are not limited to:

RFID reader/transmitter on line or missing

Reefer Tag battery low

Reefer Tag not reporting when no broadcast event has been received for more than a predetermined period of time (by default preferably approximately 15 minutes)

Reefer Tag missing when no broadcast event has been received for more than a predetermined period of time (by default preferably approximately 60 minutes). When this event is reported to the host software, the Reefer Tag is also preferably removed from the API internal list.

Once a Reefer Tag has been connected to a Reefer Unit, the host software may establish the monitoring configuration of the Reefer Tag. This monitoring configuration may be modified, as desired, at any time and as many times as needed via the host software.

The Application Programming Interface will store internally in the host computer memory a list of all Reefer Tags in the field (including their status and other associated information) and all RFID readers/transmitters detected. All information regarding the Reefer Tag will be used to generate various alarm or event or to define which RFID reader/transmitter to use in order to communicate with a Reefer Tag.

For the RFID readers/transmitters, the API will provide a functionality to discover all RFID readers/transmitters present on all configured buses. A brief explanation of the RFID reader discovery process is provided. A reader has at least 2 connections, e.g., a master bus and a slave bus. Communication is received on the master bus and can be forwarded to the slave bus. The slave bus can be connected or disconnected by sending a configuration command. When the slave port is disconnected, data received on the master bus will not be forwarded to the slave bus. A device is given a configurable address, a special address is reserved for the device with the slave port disconnected. When using the special address for the device with disconnected slave port, no device or only 1 device will respond to the communication. Another special address is reserved for broadcasting so all readers will process the command but they will not acknowledge it. By default when a device starts it connects the slave port. The discovery process consists of:

1—Broadcasting a command to ask all devices to disconnect the slave port.

2—Using the special address, query the reader with disconnected slave port.

3—If a reader does respond, a unique address is assigned to this reader and thereafter the reader is instructed to connect its slave port. Repeat step 2.

4—If there is no response from any reader, this means that there is no more readers on the bus.

A configured bus is defined as a communication interface configured by the host software. Based on the type of RS422 converter it can be a serial port or an IP address. All physical communication interfaces shall be provided by the host software to the API.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

The invention claimed is:

1. A system for monitoring data associated with at least one temperature controlled container comprising:
at least one Reefer Unit for retrieving the monitored data of the at least one temperature controlled container for wireless transmission of the monitored data to an evaluation unit via at least one transponder;
at least one reader/transmitter connected via a wireless interface of an antenna with the transponder; and
a bus for transmitting via the wireless interface the monitored data from the at least one reader/transmitter to a converter which then transmits the converted monitored data via a second communication interface to the evaluation unit; the evaluation unit including host software for generating at least one of a command, control and programming signal; the at least one command, control and programming signal from the evaluation unit being transmitted to the at at least one reader/transmitter; the at least one command, control and programming signal from the at least one reader/transmitter being passed to the at least one Reefer Unit; and the at least one transponder awaiting a response from the at least one Reefer Unit to the at least one command control and programming signal.

2. The system in accordance with claim 1, wherein the data being monitored is at least one physical parameter.

3. The system in accordance with claim 2, wherein the at least one physical parameter includes at least one of: (i) temperature and/or humidity interiorly of and/or exteriorly surrounding the temperature controlled container; (ii) duration for which doors of the temperature controlled container are open; and (iii) an open/closed state of the door of the temperature controlled container.

4. The system in accordance with claim 2, wherein the Reefer Unit records the at least one physical parameter measured using at least one sensor and the corresponding transponder retrieves the measured at least one physical parameter and transmits it to the evaluation unit via the corresponding at least one reader/transmitter, the bus and the converter.

5. The system in accordance with claim 1, wherein the wireless interface between the transponder and the antenna is bidirectional, and that the monitored data includes at least one of command data, control data and programming data transmitted from the evaluation unit.

6. The system in accordance with claim 1, characterized in that the monitored data is transmitted to and/or from the evaluation unit via the Internet.

7. The system in accordance with claim 1, wherein the transponder and the antenna are separated by up to approximately 500 m.

8. The system in accordance with claim 1, wherein the transponder, the antenna and the reader/transmitter operate using active RFID technology.

9. The system in accordance with claim 1, wherein in any mode a continuous test is performed to check if the at least one Reefer Unit is connected to the at least one transponder and if the at least one Reefer Unit is electrically powered ON.

10. The system in accordance with claim 1, wherein the evaluation unit is a host computer or server.

11. The system in accordance with claim 3, wherein the bus is a serial bus.

12. A method for evaluating information associated with and control of at least one Reefer Unit for at least one temperature controlled container, the method comprising the steps of:

retrieving data of the at least one temperature controlled container with the at least one Reefer Unit;

transmitting the retrieved data from at least one transponder to at least one reader/transmitter via wireless transmission;

sending the received data to a host computer via the at least one reader/transmitter;

evaluating using host software the data at the host computer;

displaying the evaluated data;

generating using the host software at the host computer at least one of a command, control and programming signal;

transmitting the at least one command, control and programming signal from the host computer to the at least one reader/transmitter;

passing the at least one command, control and programming signal from the at least one reader/transmitter to the at least one Reefer Unit, and the at least one transponder waiting for a response from the at least one Reefer Unit to the at least one command, control and programming signal.

13. The method in accordance with claim 12, wherein the transponder is a Reefer tag programmed to operate in a Standby-Mode, a Connecting-Mode, a Standard-Mode, a Monitoring-Mode and a pass-through mode.

14. The method in accordance with claim 13, wherein while in any mode a continuous test is performed to check if the at least one Reefer Unit is connected to the at least one transponder and if the at least one Reefer Unit is electrically powered ON.

15. The system in accordance with claim 1, wherein the transponder is a Reefer tag programmed to operate in a Standby-Mode, a Connecting-Mode, a Standard-Mode, a Monitoring-Mode and a pass-through mode.

\* \* \* \* \*